(12) United States Patent  
Klebanov et al.

(10) Patent No.: US 9,866,014 B2
(45) Date of Patent: Jan. 9, 2018

(54) ELECTRONIC DEVICE WITH SHARED EOS PROTECTION AND POWER INTERRUPTION MITIGATION

(71) Applicant: Allegro MicroSystems, LLC, Worcester, MA (US)

(72) Inventors: Maxim Klebanov, Newton, MA (US); Washington Lamar, Mount Vernon, NH (US)

(73) Assignee: Allegro MicroSystems, LLC, Worcester, MA (US)

(*) Notice: Subject to any disclaimer, the term of this patent is extended or adjusted under 35 U.S.C. 154(b) by 162 days.

(21) Appl. No.: 14/619,626

(22) Filed: Feb. 11, 2015

(65) Prior Publication Data

US 2016/0233670 A1    Aug. 11, 2016

(51) Int. Cl.
*H02H 9/04* (2006.01)

(52) U.S. Cl.
CPC ..................... *H02H 9/04* (2013.01)

(58) Field of Classification Search
CPC ........................................................ H02H 9/04
See application file for complete search history.

(56) References Cited

U.S. PATENT DOCUMENTS

| | | | |
|---|---|---|---|
| 5,721,656 A * | 2/1998 | Wu | H01L 27/0251 257/355 |
| 6,756,834 B1 * | 6/2004 | Tong | H01L 27/0251 327/309 |
| 8,922,962 B2 | 12/2014 | Lamar et al. | |
| 2007/0062726 A1 * | 3/2007 | Chang | H01G 4/38 174/260 |
| 2008/0183335 A1 * | 7/2008 | Poth | F24F 11/0086 700/276 |
| 2010/0052424 A1 * | 3/2010 | Taylor | H01L 23/5223 307/45 |
| 2013/0208385 A1 * | 8/2013 | Salcedo | H01L 23/60 361/111 |
| 2014/0176110 A1 | 6/2014 | Lamar et al. | |
| 2014/0268448 A1 * | 9/2014 | Tseng | H01L 24/81 361/56 |

* cited by examiner

*Primary Examiner* — Scott Bauer
(74) *Attorney, Agent, or Firm* — Daly, Crowley, Mofford & Durkee, LLP (57) ABSTRACT

In an embodiment, an electronic device comprises a shared electrical over-stress (EOS) protection circuit. The shared EOS protection circuit may be coupled between a power input terminal and ground terminal to provide an EOS current path from the power input terminal to the ground terminal, and coupled between the output terminal and the ground terminal to provide an EOS current path from the output terminal to the ground terminal. The electronic device may also include a power interruption mitigation circuit to provide power to the electronic device during interruptions or fluctuations in external power.

28 Claims, 7 Drawing Sheets

ELECTRONIC DEVICE WITH SHARED EOS PROTECTION AND POWER INTERRUPTION MITIGATION

CROSS-REFERENCE TO RELATED APPLICATIONS

Not Applicable.

FIELD

This disclosure relates to electrical overstress and power event circuits and, more particularly, to devices with protection for electrostatic discharge events and/or power interruption events.

BACKGROUND

Electronic devices sometimes operate in environments that can damage the components and devices. Installation of a device in an automobile, for example, can expose electronic devices to wide swings in temperature as well as fluctuations in power. The power provided by automotive alternators and power regulators may provide power that fluctuates, especially during certain events such as start-up and shut-down of the vehicle. Devices used in manufacturing environments can also experience power fluctuations. If, for example, a power-hungry system or process draws on the manufacturing plant's electrical system, interruptions or fluctuations in power can occur that affect any device connected to the plant's power infrastructure. Electronic devices that can withstand power fluctuations without affecting operation provide benefits in these environments, especially if the electronic device is part of a safety system or other critical system such as an automotive braking system, an automotive transmission system, an automated robotic arm, etc.

Electronic devices may also be subject to electrical overstress ("EOS") conditions such as an electrostatic discharge ("ESD") event occurring between exposed pins or terminals of the device. These events can occur if there is a system fault or if the electronic device is exposed to an external charge. For example, the human body can store a charge that can correlate into a stored voltage as high as 25 kV. If a charged body touches an external terminal of the electronic device, that charge can be transferred to and potentially damage the device. Many devices contain ESD protection circuits that provide paths for current due to ESD events to flow without damaging internal circuitry of the device. Providing multiple ESD protection circuits within a device can increase the manufacturing cost of the device.

SUMMARY

In an embodiment, an electronic device comprises a power input terminal to receive power for the electronic device, an output terminal, and a ground terminal. A shared electrical over-stress (EOS) protection circuit may also be included. The shared EOS protection circuit may be coupled between the power input terminal and the ground terminal to provide an EOS current path from the power input terminal to the ground terminal, and coupled between the output terminal and the ground terminal to provide an EOS current path from the output terminal to the ground terminal.

One or more of the following features may be included. The electronic device may be further coupled between the power input terminal and the output terminal to provide an EOS current path from the power input terminal to the output terminal and from the output terminal to the power input terminal. The EOS protection circuit may include a power clamp. The power clamp may comprise one or more of a Zener diode, a bipolar transistor based electrostatic discharge (ESD) clamp, a MOS transistor based ESD clamp, and an SCR based ESD clamp. The EOS protection circuit may be further coupled to provide an EOS current path from the ground terminal to the power input terminal and from the ground terminal to the output terminal. The electronic device may further include a power interruption mitigation circuit having a power terminal to provide power to the electronic device if the power for the electronic device is interrupted.

The power interruption mitigation circuit may be configured to provide power to the electronic device during relatively brief interruptions of the power that is provided to the power input terminal from an external source. The shared EOS protection circuit may be coupled to the power terminal to provide an EOS current path from the power terminal to the ground terminal. The shared EOS protection circuit may be further configured to provide an EOS current path from the power terminal to the output terminal. The shared EOS protection circuit may be configured to provide an EOS current path from the power terminal to the power input terminal.

The power interruption mitigation circuit may include an energy storage device to provide power to the electronic device during interruptions of power. The energy storage device may be a capacitor internal to the electronic device. The energy storage device may be a capacitor external to the electronic device. The power may be provided to an internal power regulator of the electronic device.

The electronic device may be a magnetic field sensor comprising one or more magnetic field sensing elements. The magnetic field sensing elements may be Hall effect elements or magnetoresistive elements. The magnetoresistive elements may be selected from a list consisting of: MTJ, TMR, GMR, spin-valve, and AMR magnetoresistive elements.

The electronic device also may comprise an integrated circuit including the EOS protection circuit.

In another embodiment, an electronic device comprises a first terminal, a second terminal, a third terminal, and a shared electrical over-stress (EOS) current path arranged between the first terminal and the third terminal and between the second terminal and the third terminal.

One or more of the following features may be included. The shared EOS current path may include a shared EOS protection circuit. The shared EOS current path may be further arranged between the first terminal and the second terminal. The electronic device may also include a power interruption mitigation circuit having a power terminal. The EOS current path may be further arranged between the power terminal and the third terminal. The power interruption mitigation circuit may provide power to an internal power node of the electronic device.

In another embodiment, an apparatus includes a device package comprising an electronic device, a first terminal to receive power for the electronic device from an external power source, a second terminal, and a third terminal. A voltage regulator for regulating the power from the external power source may also be included. A power interruption mitigation circuit comprising an energy storage device may be coupled to provide power to the voltage regulator during interruption of the power from the external power source.

One or more of the following features may be included. At least a portion of the power interruption mitigation circuit may be internal to the device package. The energy storage device may be a capacitor. The device package may include a semiconductor substrate and the capacitor may be supported by the semiconductor substrate. The device package may include a lead frame having leads and the capacitor may be supported by one or more of: the lead frame and one or more of the leads.

The apparatus may include a shared electrical over-stress (EOS) protection circuit coupled between the first terminal and the third terminal to provide an EOS current path between the first and third terminals, and coupled between the second and third terminals to provide an EOS current path between the second and third terminals. The shared EOS protection circuit may be further coupled between the first and second terminals to provide an EOS current path between the first and second terminals. The shared EOS protection circuit may be coupled to an output terminal of the power interruption mitigation circuit to provide an EOS current path between the output terminal of the power interruption mitigation circuit and one or more of the first, second, and third terminals.

The apparatus may be a magnetic field sensor comprising one or more magnetic field sensing elements. The magnetic field sensing elements may be Hall effect elements or magnetoresistive elements. The magnetoresistive elements may be selected from a list consisting of: MTJ, TMR, GMR, spin-valve, and AMR magnetoresistive elements.

The apparatus also may comprise an integrated circuit including the power interruption mitigation circuit.

BRIEF DESCRIPTION OF THE DRAWINGS

The foregoing features may be more fully understood from the following description of the drawings, which aid in explaining and understanding the disclosed technology. Since it is often impractical or impossible to illustrate and describe every possible embodiment, the provided figures depict one or more example embodiments. Accordingly, the figures are not intended to limit the scope of the subject matter. Like numbers in the figures denote like elements.

DETAILED DESCRIPTION

It will be appreciated that while a substrate (e.g. a semiconductor substrate) is described as "supporting" the magnetic field sensing element, the element may be disposed "over" or "on" the active semiconductor surface, or may be formed "in" or "as part of" the semiconductor substrate, depending upon the type of magnetic field sensing element. For simplicity of explanation, such elements will be described here as being supported by the substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, a magnetic tunnel junction (MTJ), a spin-valve, etc. The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR, spin-valve) and vertical Hall elements tend to have axes of sensitivity parallel to a substrate.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term electrical overstress (or "EOS") refers to conditions that may cause failure or damage to electronic devices due to electrical, electro-thermal, and/or mechanical or contact events.

As used herein, the term electrostatic discharge (or "ESD") refers to a subclass of EOS conditions caused by high current density and/or high electric field gradient in the electronic device. As an example, a common ESD event is the discharge of static electricity from a human body through or into the electronic device when a part of the charged body part touches an external pin on the electronic device.

Figure 1:
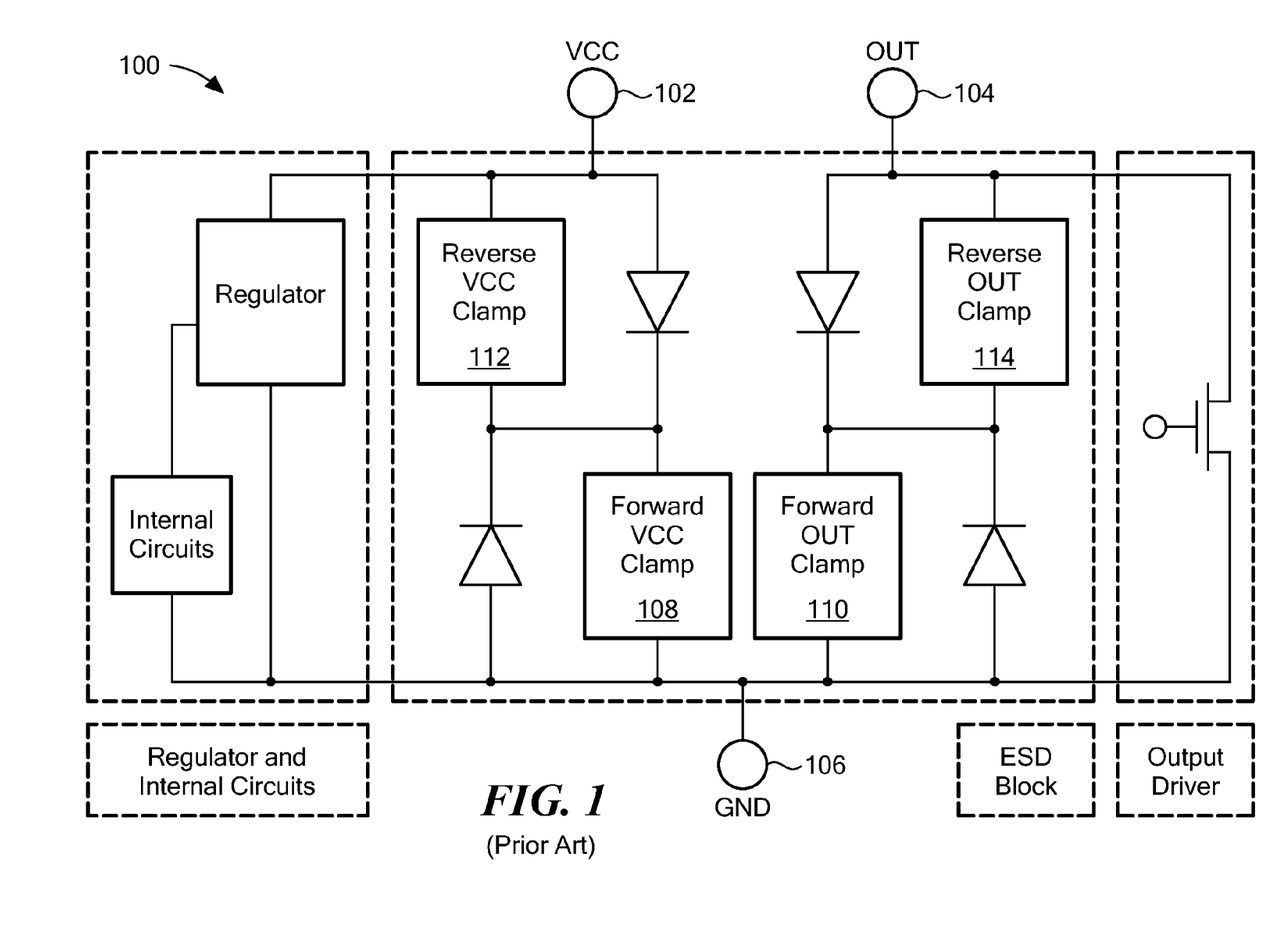
FIG. 1 is a block diagram of a circuit with electrostatic discharge (ESD) protection of the prior art.

FIG. 1 is a block diagram of a circuit 100 of the prior art. Circuit 100 may be supported by a semiconductor substrate and enclosed in a device package (not shown). The package may have three or more pins. In FIG. 1, three pins are shown: a power input terminal 102, an output terminal 104, and a ground terminal 106. Circuit 100 includes a forward VCC ESD clamp circuit 108 to protect from ESD events on power input terminal 102 and a forward OUT ESD clamp 110 to protect from ESD events on output terminal 104. Circuit 100 also includes a reverse VCC ESD clamp circuit 112 to protect from ESD events from ground terminal 106 to power input terminal 102 and a reverse OUT ESD clamp circuit 114 to protect from ESD events from ground pint 106 to output terminal 104.

The ESD clamp circuits 108, 110, 112, and 114 may be configured to allow current to flow in one direction and to block current flow in the reverse direction. However, the ESD clamp circuit may be configured to allow current to flow in the reverse direction if a reverse voltage across the ESD clamp circuit exceeds a threshold. Thus, ESD clamp circuits 108, 110, 112, and 114 may operate similarly to Zener diodes.

Figure 2:
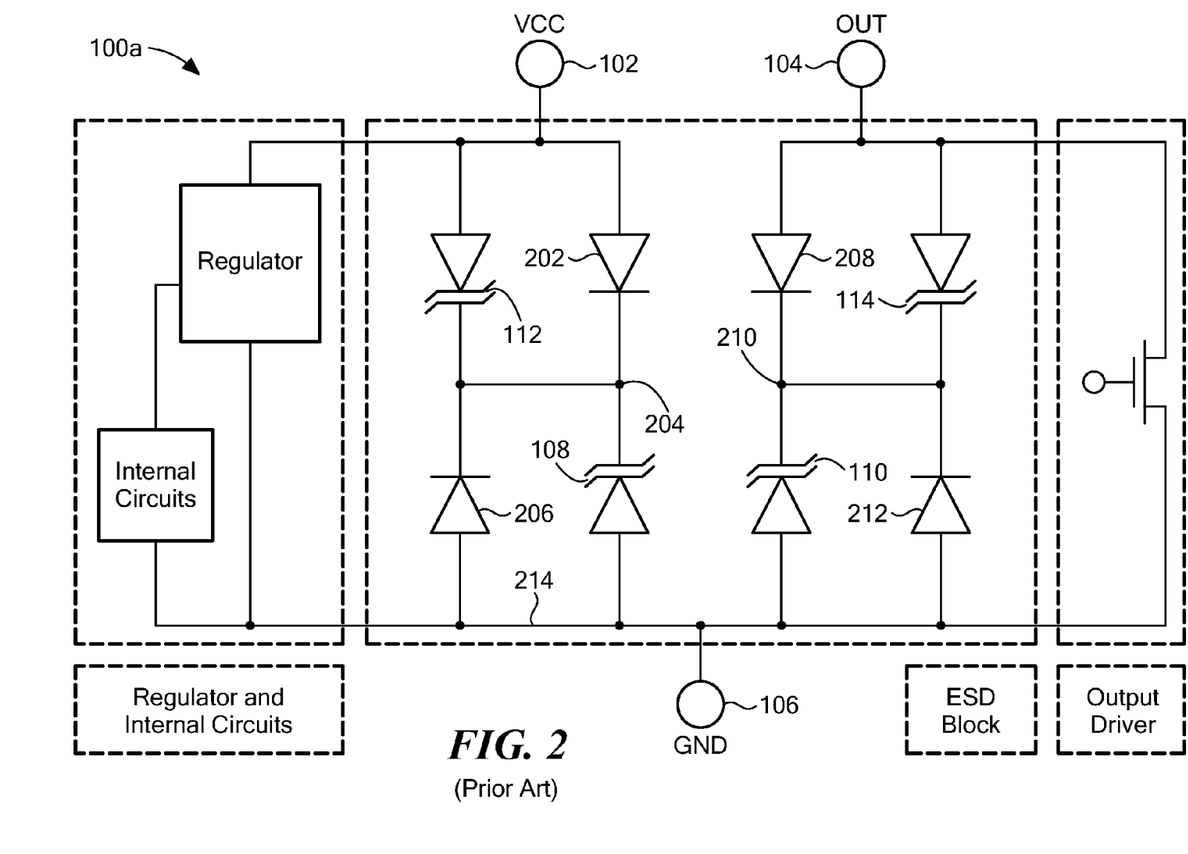
FIG. 2 is a block diagram of a circuit with ESD protection of the prior art.

Referring to FIG. 2, circuit 100a of the prior art may be the same as or similar to circuit 100. In FIG. 2, the symbols for ESD clamp circuits 108, 110, 112, and 114 have been replaced with alternate symbols in the form of Zener diodes. In operation, if an ESD event originates between power input terminal 102 and ground terminal 106, current flows from power pin 102, through ESD clamp circuit 112 and/or diode 202 to node 204. Current cannot flow from node 204 to ground terminal 106 through diode 206. However, if the ESD event causes the voltage across ESD clamp 108 to exceed the reverse breakdown voltage of ESD clamp 108, then the current may flow through ESD clamp 108 to ground terminal 106.

Similarly, if an ESD event originates between output terminal 104 and ground terminal 106, current flows from output terminal 104, through ESD clamp circuit 114 and/or diode 208 to node 210. Current cannot flow from node 210 to ground terminal 106 through diode 212. However, if the ESD event causes the voltage across ESD clamp 110 to exceed the reverse breakdown voltage of ESD clamp 110, then the current may flow through ESD clamp 110 to ground terminal 106.

If an ESD event originates on the ground terminal 106, circuit 100 (and circuit 100a) provide current paths to allow current to flow from ground terminal 106 to power input terminal 102 and/or output terminal 104. Current may flow from ground terminal 106 through ESD clamp 108 and/or diode 206 to node 204. If the voltage caused by the ESD event creates a voltage from node 204 to power input terminal 102 that exceeds the reverse breakdown voltage of ESD clamp 112, then current may flow through ESD clamp 112 to power input terminal.

Similarly, current between ground terminal 106 and output terminal 104 may flow from ground terminal 106 through ESD clamp 110 and/or diode 212 to node 210. If the voltage caused by the ESD event exceeds the reverse breakdown voltage of ESD clamp 114, then current may flow through ESD clamp 114 to output terminal 104.

Circuit 100 (and 100a) also provides an ESD current path from power input terminal 102 to output terminal 104. Assuming the voltage caused by the ESD event exceeds the cumulative reverse breakdown voltages of ESD clamps 108 and 114, current caused by the ESD event originating at power input terminal 102 may flow through ESD clamp 112 and/or diode 202 to node 204, from node 204 through ESD clamp 108 to node 214, from node 214 through ESD clamp 110 and/or diode 212 to node 210, and from node 210 through ESD clamp 114 to output terminal 104.

Similarly, circuit 100 (and 100a) also provides an ESD current path from output terminal 104 to power input terminal 102. Assuming the voltage caused by the ESD event exceeds the cumulative reverse breakdown voltages of ESD clamps 110 and 112, current caused by the ESD event originating at output terminal 104 may flow through ESD clamp 114 and/or diode 208 to node 210, from node 210 through ESD clamp 110 to node 214, from node 214 through ESD clamp 108 and/or diode 206 to node 204, and from node 204 through ESD clamp 112 to power input terminal 102.

Figure 3:
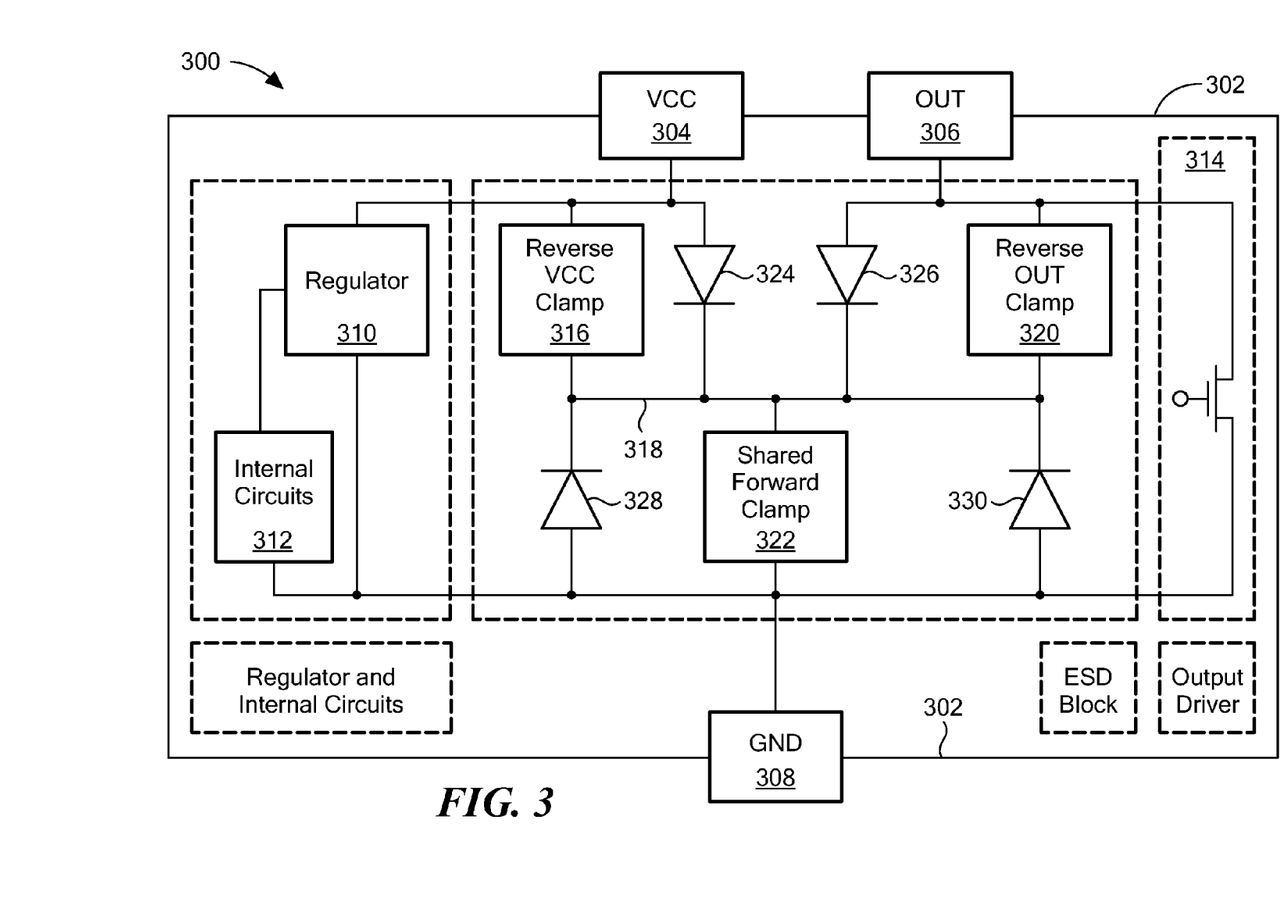
FIG. 3 is a block diagram of an embodiment of a device with a shared EOS protection circuit for protection from electrical over-stress (EOS) conditions.

Referring to FIG. 3, electronic device 300 includes an electronic device package 302 with a first terminal 304 (which may be a power input terminal, for example), a second terminal 306 (which may be an output terminal, for example), and a third terminal 308 (which may be a ground terminal, for example). Package 302 may be any type of electronic device package configured to house integrated circuits including, but not limited to, a small pin count IC package, a through-hole package, a surface mount package, a chip carrier package, a pin grid array ("PGA") package, a flat package, a small outline package, a chip-scale package, a ball grid array ("BGA") package, etc. Although not shown, electronic device 300 may also include a silicon or other semiconductor substrate to support any or all of the circuits described, a lead frame, and lead or bond wires to connect pins or terminals of the lead frame to connection points on the substrate.

Power input terminal 304 may be configured to receive power from an external power source, such as a DC voltage source. The power may be received by power regulator 310, which may provide regulated power to internal circuitry 312 of electronic device 300. Output terminal may be configured to provide an output signal driven by output driver circuit 314 and/or other circuits within device 300. Ground terminal 308 may be configured to provide a return path/ground connection for electronic device 300.

In an embodiment, electronic device 300 may include an EOS protection circuit 316 configured to allow current to flow from node 318 to terminal 304 when the voltage from node 318 to terminal 304 exceeds a breakdown voltage of EOS protection circuit 316. Electronic device 300 may also include an EOS protection circuit 320 configured to allow current to flow from node 318 to output terminal 306 when the voltage from node 318 to terminal 306 exceeds a breakdown voltage of EOS protection circuit 320.

Electronic device 300 may also include a shared EOS protection circuit 322 configured to allow current to flow from node 318 to terminal 308 when the voltage from node 318 to terminal 308 exceeds a breakdown voltage of shared EOS protection circuit 322. The breakdown voltage of EOS protection circuits 316, 320, and/or 322 may refer to a voltage which, when exceeded, allows current to flow through the EOS protection circuit. In an embodiment, the breakdown voltage may be between about 20V and about 30V.

Shared EOS protection circuit 322 may be configured to provide a shared current path for current from EOS events to flow. For example, shared EOS protection circuit 322 may be coupled to allow current (e.g. from an ESD event) to flow through EOS protection circuit 322 from terminal 304 to terminal 308, and also through EOS protection circuit 322 from terminal 306 to terminal 308.

Electronic device 300 may also include diodes 324, 326, 328, and 330 to direct current flow through electronic device 300.

In the case of an ESD event between nodes 304 and 308 that causes the voltage from node 318 to terminal 308 to exceed the breakdown voltage of shared EOS protection circuit 322, current may flow from terminal 304 through EOS protection circuit 316 and/or diode 324 to node 318, then from node 318 through shared EOS protection circuit 322 to terminal 308. Similarly, in the case of an ESD event between terminals 306 and 308 that causes the voltage from node 318 to terminal 308 to exceed the breakdown voltage of shared EOS protection circuit 322, current may flow from terminal 306 through EOS protection circuit 320 and/or diode 326 to node 318, then from node 318 through shared EOS protection circuit 322 to terminal 308. In each case, shared EOS protection circuit 322 may provide a shared EOS current path from node 318 to terminal 308. In an embodiment, the EOS current path may comprise a conductive path to direct EOS and/or ESD current through the electronic device to prevent damage to the internal circuits of the electronic device.

In certain embodiments, EOS protection circuits 316 and 320, and shared EOS protection circuit 322 may allow current to flow freely in a forward direction, while only allowing current to flow in a reverse direction if the breakdown voltage is exceeded. For example, EOS protection circuit 316 may allow current to flow freely from terminal 304 to node 318 and prevent current from flowing from node 318 to terminal 304 unless the breakdown voltage is exceeded. Similarly, EOS protection circuit 320 may allow current to flow freely from terminal 306 to node 318 and prevent current from flowing from node 318 to terminal 306 unless the breakdown voltage is exceeded. Likewise, EOS protection circuit 322 may allow current to flow freely from terminal 308 to node 318 and prevent current from flowing from node 318 to terminal 308 unless the breakdown voltage is exceeded. In other embodiments, any one or more of the EOS protection circuits may be configured so that current does not flow through the EOS protection circuit in a forward direction, and only flows through the EOS protection circuit in a reverse direction (e.g. when the breakdown voltage is exceeded).

Figure 4:
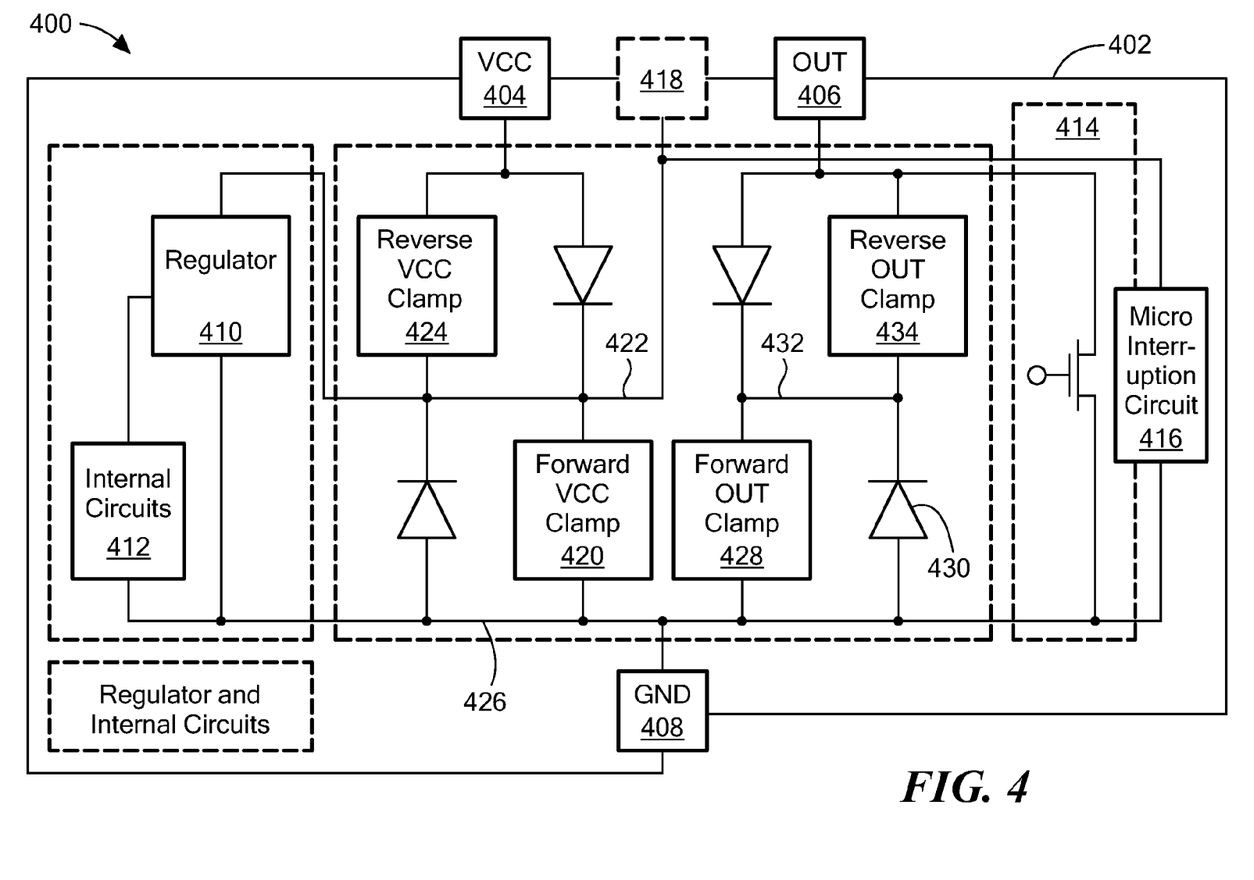
FIG. 4 is a block diagram of an embodiment of a device comprising a power interruption mitigation circuit.

Referring to FIG. 4, electronic device 400 includes an electronic device package 402, which may be the same as or similar to electronic device package 302. Package 402 may include a first terminal 404 (which may be a power input terminal, for example), a second terminal 406 (which may be an output terminal, for example), and a third terminal 408 (which may be a ground terminal, for example).

Power input terminal 404 may be configured to receive power from an external power source, such as a DC voltage source. The power may be received by power regulator 410, which may provide regulated power to internal circuitry 412 of electronic device 400. Output terminal 406 may be configured to provide an output signal driven by output driver circuit 414 and/or other circuits within electronic device 400. Ground terminal 408 may be configured to provide a return path/ground connection for electronic device 400.

In certain applications, electronic device 400 may experience power interruptions or fluctuations. For example, power fluctuations can occur in certain environments where power surges or dips may occur, such as in a manufacturing or automotive environment. If electronic device 400 is operating in such an environment, it may be subject to interruptions in power which can interfere with the operation of electronic device 400. In addition, interruptions in power or power surges can cause EOS (?) events as described above.

To compensate for interruptions in power, circuit 400 may include a power interruption mitigation circuit 416 which can provide power to electronic device 400 in the event of a power interruption. Power interruption mitigation circuit 416 may be internal to package 402 as shown, or may be external to package 402 and coupled to an external pin or terminal of package 402. In other embodiments, at least a portion of power interruption mitigation circuit may be internal to package 402. In general, power interruption mitigation circuit 416 may be configured to provide power during relatively short power interruptions or fluctuations. For example, power interruption mitigation circuit may be configured to provide power to electronic device for periods as long as 20 microseconds, 100 microseconds, 300 microseconds, 500 microseconds, or longer.

In an embodiment, power interruption mitigation circuit 416 may be internal to package 402. For example, power interruption mitigation circuit 416 may be supported by a semiconductor substrate within package 400 and may not be exposed to an external pin or terminal of electronic device 400. Thus, power interruption mitigation circuit 416 may be configured to provide power to regulator 410 (and/or other circuits within electronic device 400) without the need for an external capacitor or other external energy storage device to provide power to electronic device 400. In other embodiments, power interruption mitigation circuit 416 may be optionally coupled to a power terminal, such as terminal 418. An external power source (such as a capacitor, battery, etc.) can be coupled to terminal 418 to supplement the power provided to regulator 410 by power interruption mitigation circuit 416.

Power terminal 418 may be coupled to node 422 to provide power to regulator 410. EOS protection circuits 420 and 424 may also be coupled to node 422 to provide an EOS or ESD current path in case of an ESD event on terminal 418. If an ESD event occurs between terminal 418 and terminal 408, current may flow from terminal 418, through node 422, and through EOS protection circuit 420 to terminal 408. If an ESD event occurs between terminal 418 and 404, current may flow from terminal 418, to node 422, and through EOS protection circuit 424 to terminal 404. Although not shown, an additional EOS protection circuit and diode may be included to provide a current path from node 422 to terminal 418.

EOS protection circuit 420 may act as a shared EOS protection circuit to provide the current path described above from terminal 418 to terminal 408, and also to provide a current path from terminal 404 to terminal 408, from terminal 404 to terminal 406, and from terminal 418 to terminal 406. If an ESD event originates between terminal 404 and terminal 406 or between terminal 418 and terminal 406, current my flow from terminal 404 and/or terminal 418 to node 422, from node 422 through EOS protection circuit 420 to node 426, from node 426 through EOS protection circuit 428 and/or diode 430 to node 432, and finally through EOS protection circuit 434 to terminal 406. As described above, current may flow in the reverse direction through EOS protection circuit 420 and 434 if the ESD event causes the voltage across EOS protection circuit 420 and 434 to exceed the breakdown threshold of those circuits.

Figure 5:
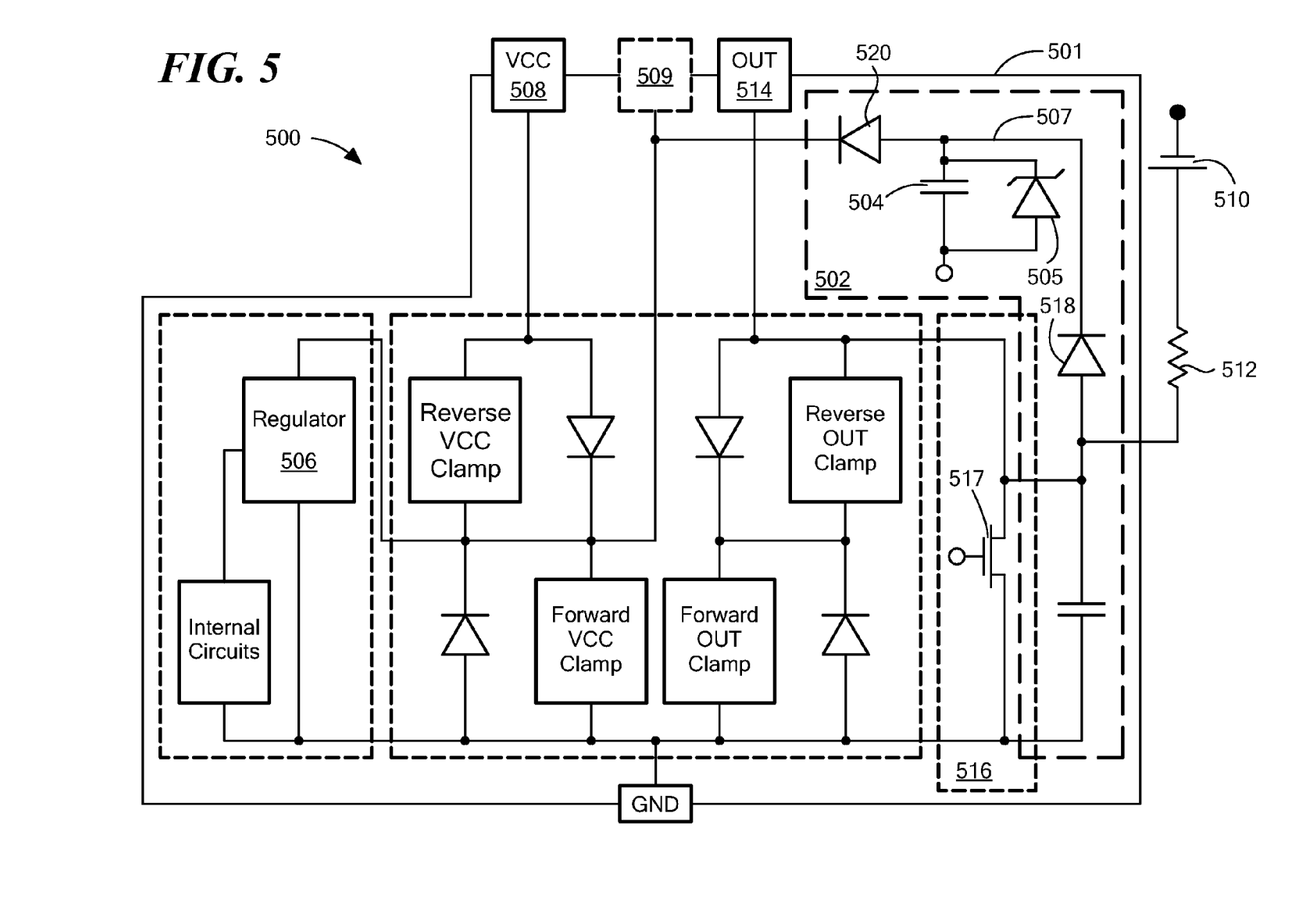
FIG. 5 is a block diagram of an embodiment of a device comprising a power interruption mitigation circuit.

Referring to FIG. 5, electronic device 500 includes an electronic device package 501 and a power interruption mitigation circuit 502. Electronic device 500 may be the same as or similar to electronic device 400 and power interruption mitigation circuit 502 may be the same as or similar to power interruption mitigation circuit 416.

Electronic device 500 may also include or be coupled to external power source 510 and pull-up resistor 512. Pull-up resistor 512 may be internal to or external to the electronic device package. If pull-up resistor 512 is internal to the electronic device package, it may be supported on a silicon substrate of electronic device 500 or by a lead frame or lead of electronic device 500. If pull-up resistor is external to the electronic device package, it may be coupled to an external pin of the package. External power source 510 may also be coupled, either directly or indirectly, to terminal 508 to provide power to electronic device 500.

Pull-up resistor 512 may be coupled to output terminal 514 to pull up the voltage on output terminal 514. Output driver circuit 516 may include a switch (such as transistor 517, for example) to pull the voltage at terminal 514 to ground. Thus output driver can create a digital output signal on terminal 514 by pulling the voltage at terminal 514 to ground and releasing it to allow pull-up resistor 512 to pull the voltage back up.

Power interruption mitigation circuit 502 may include an energy storage device, such as capacitor 504, to provide power to regulator 506 during interruptions of external power provided to power input terminal 508. Capacitor 504 may be internal to electronic device package 501. For example, capacitor 504 may be supported by a semiconductor substrate, a lead frame, or a lead within electronic device package 501. In other embodiments, capacitor 504 may be external to the electronic device package and may be coupled to regulator 506 via an external pin such as terminal 509. In another embodiment, capacitor 504 may be internal to package 501 as shown, and an additional power source, energy storage device, capacitor, etc. may be coupled to terminal 509 to supplement the power provided by capacitor 504 to regulator 506.

Power interruption mitigation circuit 502 may also include an EOS protection circuit such as Zener diode 505. Zener diode 505 may protect capacitor 504 from an EOS or ESD event by allowing current to flow from node 507 to ground if the voltage between node 507 and ground exceeds the breakdown voltage of Zener diode 505.

In the embodiment shown in FIG. 5, capacitor 504 may be charged by external power source 510. When the voltage on output terminal 514 is high (i.e. pulled-up by power source 510 and pull-up resistor 512), current may flow through diode 518 to charge capacitor 504. When the voltage on output terminal 514 is low, diode 518 may prevent capacitor 504 from discharging through transistor 517. Diode 520 is coupled to capacitor 504 so that, during a power interruption, current can flow from capacitor 504 to provide power to regulator 506.

Diode 520 may also prevent or mitigate an EOS/ESD current originating from an EOS/ESD event between terminal 508 and ground and/or between terminal 509 and ground. Diode 520 may prevent or limit current from flowing into the node 507 and damaging capacitor 504 or diode 505. Diode 505 may act to limit the voltage across capacitor 504 in the event of an ESD strike.

During operation, capacitor 504 may be charged by power source 510. As noted above, electronic device 500 may be installed in an environment where interruptions to power may occur on terminal 508. During such interruptions, capacitor 504 may supply power to regulator 506 (and/or other circuits within electronic device 500) so that electronic device 500 can continue to operate in the presence of power interruptions.

Figure 6:
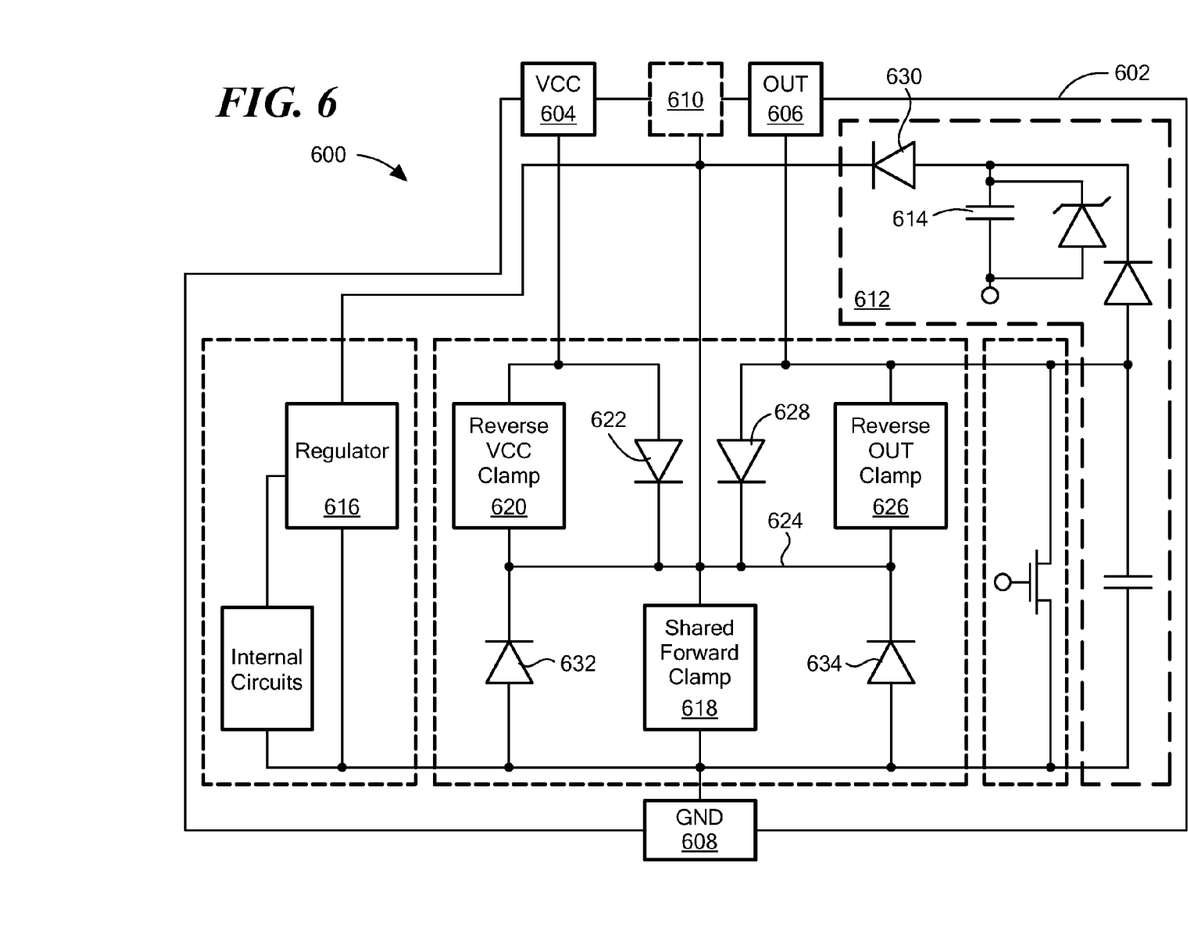
FIG. 6 is a block diagram of an embodiment of a device with a shared EOS protection circuit for protection from EOS conditions and a power interruption mitigation circuit.

Referring to FIG. 6, electronic device 600 includes an electronic device package 602, which may be the same as or similar to electronic device package 302. Package 602 may include a first terminal 604 (which may be a power input terminal, for example), a second terminal 606 (which may be an output terminal, for example), and a third terminal 608 (which may be a ground terminal, for example). Optionally, electronic device 600 may also include an external terminal 610.

Electronic device 600 may include a power interruption mitigation circuit 612 which may be the same as or similar to power interruption mitigation circuit 416 and/or 502. Power interruption mitigation circuit 612 may comprise an energy storage device, such as capacitor 614, which may store energy and provide power to regulator 616 during interruptions of external power on terminal 604. Capacitor 614 may be internal to package 602 as shown, and may be supported by a semiconductor substrate, a lead frame, or a lead wire within package 602. In other embodiments, capacitor 614 may be external to package 602 and coupled to an external pin or terminal of package 602, such as terminal 604 or 610.

Electronic device 600 may also include a shared EOS protection circuit 618 which may be configured to provide a shared EOS current path from any one or more of terminals 604, 606, and 610, through shared EOS protection circuit 618, to terminal 608 and/or between one or more of terminals 604, 606, and 610.

If, for example, an ESD event occurs between terminal 604 and terminal 608, current may flow from terminal 604, through EOS protection circuit 620 and/or diode 622 to node 624, and from node 624 through EOS protection circuit 618 to terminal 608. If an ESD event occurs between terminal 606 and terminal 608, current may flow from terminal 606, through EOS protection circuit 626 and/or diode 628 to node 624, and from node 624 through EOS protection circuit 618 to terminal 608.

If an ESD event occurs between terminal 610 and terminal 608, current may flow from terminal 610 to node 624, and from node 624 through EOS protection circuit 618 to terminal 608. Similarly, if an electrical overstress event occurs at the cathode of diode 630, shared EOS protection circuit may allow current to flow from diode 630, through node 624 and EOS protection circuit 618, to terminal 608. Although not shown, if optional terminal 610 is present, electronic device 600 may include an additional EOS protection circuit and diode coupled between terminal 610 and node 624, similar to or the same as EOS protection circuit 620 and diode 622 coupled between terminal 604 and node 624.

Figure 7:
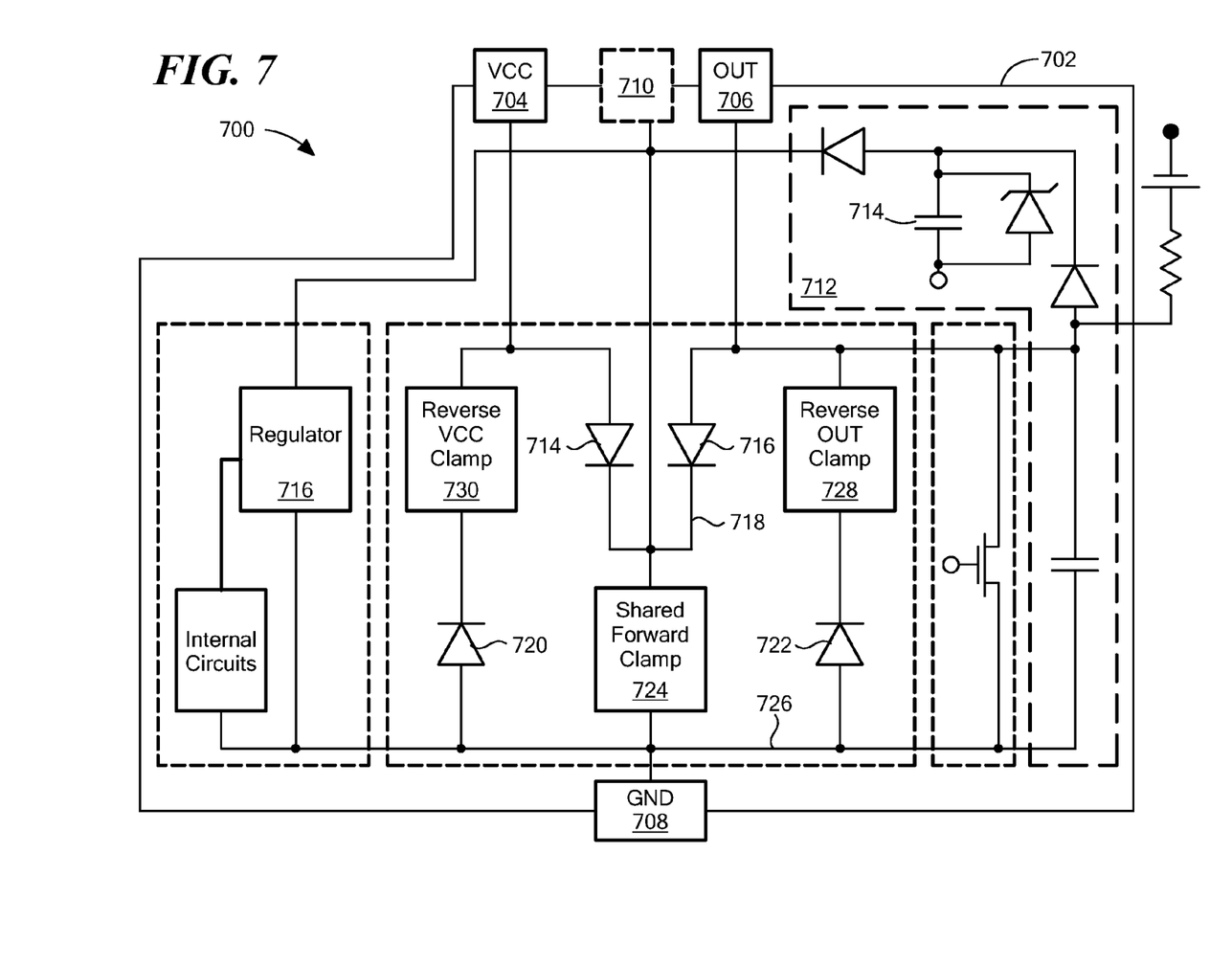
FIG. 7 is a block diagram of an embodiment of a device with a shared EOS protection circuit for protection from EOS conditions and a power interruption mitigation circuit.

Referring now to FIG. 7, electronic device 700 includes an electronic device package 702, which may be the same as or similar to electronic device package 302. Package 702 may include a first terminal 704 (which may be a power input terminal, for example), a second terminal 706 (which may be an output terminal, for example), and a third terminal 708 (which may be a ground terminal, for example). Optionally, electronic device 700 may also include an external terminal 710.

Electronic device 700 may include a power interruption mitigation circuit 712 which may be the same as or similar to power interruption mitigation circuit 416, 502, and/or 612. Power interruption mitigation circuit 712 may comprise an energy storage device, such as capacitor 714, which may store energy and provide power to regulator 716 during interruptions of external power on terminal 704. Capacitor 714 may be internal to package 702 as shown, and may be supported by a semiconductor substrate, a lead frame, or a lead within package 702. In other embodiments, capacitor 714 may be external to package 702 and coupled to an external pin or terminal of package 702, such as terminal 704 or 710.

Electronic device 700 may also include a shared EOS protection circuit 718 which may be configured to provide a shared EOS current path from any one or more of terminals 704, 706, and 710, through shared EOS protection circuit 724, to terminal 708; and also to provide a shared EOS current path between one or more of terminals 704, 706, and 710.

Referring again to FIG. 6, the cathodes of diodes 622, 628, 632, and 634 are coupled to node 624. This provides an EOS current path from terminal 604 to terminal 606 that does not extend through EOS protection circuit 618. In contrast, the cathodes of diodes 714 and 716 in FIG. 7 are coupled to node 718, but the cathodes of diodes 720 and 722 are not. Thus, in FIG. 7, shared EOS protection circuit 724 also provides an EOS current path between terminals 704 and 706.

If an ESD event occurring between terminal 704 and terminal 706 originates on terminal 704, current may flow from terminal 704, through diode 714 to node 718, from node 718 through EOS protection circuit 724 to node 726, and from node 726 through diode 722 and EOS protection circuit 728 to terminal 706. Similarly, if an ESD event occurring between terminal 704 and terminal 706 originates on terminal 706, current may flow from terminal 706, through diode 716 to node 718, from node 718 through EOS protection circuit 724 to node 726, and from node 726 through diode 720 and EOS protection circuit 730 to terminal 704.

In embodiments, any one or more of EOS protection circuits described above may comprise an ESD clamp circuit. The ESD clamp circuit may include one or more of: a Zener diode, a bipolar transistor based electrostatic discharge (ESD) clamp, a MOS transistor based ESD clamp, and/or an SCR based ESD clamp.

In embodiments, any one or more of electronic devices 300, 400, 500, 600, and/or 700 may be magnetic field sensors configured to detect an external magnetic field. In an embodiment, the devices may be so-called three-pin sensors having three external pins. Such sensors may be used in automotive applications such as braking or transmission systems to measure speed, rotation, position, or other operating parameters of the system. Magnetic field sensors can also be used in manufacturing applications to control or measure position, speed, or other operating parameters of a robotic arm, for example. Magnetic field sensors may also be used in many other applications.

It will be recognized that not all embodiments can be listed in this document and that other embodiments fall within the scope of the following claims.

The invention claimed is:

1. An electronic device comprising:
a power interruption mitigation circuit configured to provide power to the electronic device if the power for the electronic device is interrupted;
a power input terminal to receive power for the electronic device; a power mitigation input terminal to receive power for the power interruption mitigation circuit;
an output terminal;
a ground terminal; and
a shared electrical over-stress (EOS) protection circuit comprising a power clamp circuit having:
one terminal coupled to the power input terminal, the power mitigation input terminal, and the output terminal; and
another terminal coupled directly to the ground terminal to provide a first EOS current path from the power input terminal to the ground terminal, a second EOS current path from the output terminal to the ground terminal, and a third EOS current path from the power mitigation input terminal to the ground terminal;
wherein the first, second, and third EOS current paths comprise a single shared power clamp circuit.

2. The electronic device of claim 1 wherein the shared EOS protection circuit is further coupled between the power input terminal and the output terminal to provide an EOS current path from the power input terminal to the output terminal and from the output terminal to the power input terminal.

3. The electronic device of claim 1 wherein the power clamp comprises one or more of a Zener diode, a bipolar transistor based electrostatic discharge (ESD) clamp, a MOS transistor based ESD clamp, and an SCR based ESD clamp.

4. The electronic device of claim 1 wherein the EOS protection circuit is further coupled to provide an EOS current path from the ground terminal to the power input terminal and from the ground terminal to the output terminal.

5. The electronic device of claim 1 wherein the power interruption mitigation circuit is configured to provide power to the electronic device during relatively brief interruptions of the power that is provided to the power input terminal from an external source.

6. The electronic device of claim 1 wherein the shared EOS protection circuit is further configured to provide an EOS current path from the power mitigation input terminal to the power input terminal.

7. The electronic device of claim 1 wherein the power interruption mitigation circuit comprises an energy storage device to provide power to the electronic device during interruptions of power.

8. The electronic device of claim 7 wherein the energy storage device is a capacitor internal to the electronic device.

9. The electronic device of claim 7 wherein the energy storage device is a capacitor external to the electronic device.

10. The electronic device of claim 7 wherein the power is provided to an internal power regulator of the electronic device.

11. The electronic device of claim 1 wherein the electronic device is a magnetic field sensor comprising one or more magnetic field sensing elements.

12. The electronic device of claim 11 wherein the magnetic field sensing elements are Hall effect elements or magnetoresistive elements.

13. The electronic device of claim 12 wherein the magnetoresistive elements are selected from a list consisting of: MTJ, TMR, GMR, spin-valve, and AMR magnetoresistive elements.

14. The electronic device of claim 1 further comprising an integrated circuit including the EOS protection circuit.

15. An electronic device comprising:
a power interruption mitigation circuit configured to provide power to the electronic device if power to the electronic device is interrupted;

a first terminal;
a second terminal;
a third terminal;
a power mitigation input terminal to receive power for the power interruption mitigation circuit; and
a shared electrical over-stress (EOS) current path connected between the first terminal and the third terminal, between the second terminal and the third terminal, and between the power mitigation input terminal and the third terminal;
wherein the shared EOS current path comprises a shared EOS protection circuit including a single power clamp circuit between the terminals.

16. The electronic device of claim 15 wherein the shared EOS current path is further connected between the first terminal and the second terminal.

17. The electronic device of claim 15 further comprising a power interruption mitigation circuit having a power terminal.

18. The electronic device of claim 17 further wherein the EOS current path is further connected between the power terminal and the third terminal.

19. The electronic device of claim 17 wherein the power interruption mitigation circuit provides power to an internal power node of the electronic device.

20. An apparatus comprising:
a device package comprising an electronic device, a first terminal to receive power for the electronic device from an external power source, a second terminal, a third terminal, and a power mitigation input terminal;
a voltage regulator for regulating the power from the external power source;
a power interruption mitigation circuit comprising an energy storage device coupled to provide power to the voltage regulator during interruption of the power from the external power source, wherein the power mitigation input terminal receives power for the power interruption mitigation circuit; and
a shared EOS protection circuit comprising a single shared power clamp circuit, the shared EOS protection circuit configure to provide a first EOS current path from the first terminal to the third terminal, a second EOS current path from the second terminal to the third terminal, and a third EOS current path from the power input mitigation terminal to the third terminal.

21. The apparatus of claim 20 wherein at least a portion of the power interruption mitigation circuit is internal to the device package.

22. The apparatus of claim 20 wherein the energy storage device is a capacitor.

23. The apparatus of claim 22 wherein the device package comprises a semiconductor substrate and the capacitor is supported by the semiconductor substrate.

24. The apparatus of claim 22 wherein the device package comprises a lead frame having leads and the capacitor is supported by one or more of: the lead frame and one or more of the leads.

25. The electronic device of claim 20 wherein the electronic device is a magnetic field sensor comprising one or more magnetic field sensing elements.

26. The electronic device of claim 25 wherein the magnetic field sensing elements are Hall effect elements or magnetoresistive elements.

27. The electronic device of claim 26 wherein the magnetoresistive elements are selected from a list consisting of: MTJ, TMR, GMR, spin-valve, and AMR magnetoresistive elements.

28. The electronic device of claim 20 further comprising an integrated circuit including the power interruption mitigation circuit.

* * * * *

UNITED STATES PATENT AND TRADEMARK OFFICE
CERTIFICATE OF CORRECTION

PATENT NO. : 9,866,014 B2
APPLICATION NO. : 14/619626
DATED : January 9, 2018
INVENTOR(S) : Maxim Klebanov et al.

It is certified that error appears in the above-identified patent and that said Letters Patent is hereby corrected as shown below:

In the Specification

Column 5, Line 17, delete "ground pint 106" and replace with --ground terminal 106--

Column 8, Line 5, delete "(?)"

Column 8, Line 19, delete "circuit may" and replace with --circuit 416 may--

Column 8, Line 59, delete "current my flow" and replace with --current may flow--

Signed and Sealed this
Thirty-first Day of July, 2018

Andrei Iancu
*Director of the United States Patent and Trademark Office*